(12) United States Patent
Chen

(10) Patent No.: US 7,199,542 B1
(45) Date of Patent: Apr. 3, 2007

(54) FAN OPERATION ADAPTIVE CONTROL SYSTEM

(75) Inventor: Ting-Kai Chen, Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 11/377,011

(22) Filed: Mar. 15, 2006

(51) Int. Cl.
*H02K 9/04* (2006.01)
*G05B 11/01* (2006.01)

(52) U.S. Cl. .................. 318/473; 388/934

(58) Field of Classification Search ........ 318/471–473, 318/561, 599; 388/909, 934; 310/52, 58, 310/62–63
See application file for complete search history.

(56) References Cited

U.S. PATENT DOCUMENTS

| | | | |
|---|---|---|---|
| 6,023,139 A * | 2/2000 | Chin | 318/434 |
| 6,639,794 B2 * | 10/2003 | Olarig et al. | 361/687 |
| 6,809,497 B2 * | 10/2004 | Kudo et al. | 318/727 |
| 6,924,568 B2 * | 8/2005 | Dhuey | 307/130 |
| 7,079,758 B2 * | 7/2006 | Sunaga et al. | 388/804 |
| 7,096,134 B2 * | 8/2006 | Miller, Jr. | 702/79 |

* cited by examiner

*Primary Examiner*—Bentsu Ro
(74) *Attorney, Agent, or Firm*—Peter F. Corless; Steven M. Jensen; Edwards Angell Palmer & Dodge LLP

(57) ABSTRACT

A fan operation adaptive control system is proposed, which is designed for use with an electronic system, such as a network server, for providing the network server with an adaptive operation control function; and which is characterized by the utilization of a CPLD (Complex PLD, where PLD=Programmable Logic Device) module for implementing the adaptive operation control function for various different types of fan units, including PWM-driven type (which includes 100 Hz–500 Hz, 10 KHz–50 KHz, and 1 MHz–5 MHz subtypes) and DC-driven type, such that the network server can be equipped with just one type of temperature sensor which can be used in conjunction with these various different types of fan units. This feature allows the maintenance of heat-dissipating fan units on network servers to be more convenient and cost-effective to implement than the prior art.

8 Claims, 2 Drawing Sheets

FAN OPERATION ADAPTIVE CONTROL SYSTEM

BACKGROUND OF THE INVENTION

1. Field of the Invention

This invention relates to heat dissipating technology for electronic systems, and more particularly, to a fan operation adaptive control system which is designed for use in conjunction with an electronic system, such as a network server or a desktop computer, that is equipped with at least one heat-dissipating fan unit and a temperature sensor, for the purpose of providing the fan unit with an adaptive operation control function for adaptively control the operation of the fan unit-based on the particular type of the fan unit.

2. Description of Related Art

Electronic systems typically produce large amounts of heat during operation due to consumption of electrical power. If this heat accumulates inside the electronic system, it would eventually result in the burnout of the electronic components in the electronic system, thus causing the electronic system to shut down or fail to operate normally. One solution to this problem is to mount heat-dissipating devices, such as electrical fan units or coolant-driven air conditioners, for dissipating heat in the electronic system during operation. For example, most computer units such as network servers and desktop computers are typically equipped with one or more fan-based heat-dissipating units for use to generate air streams to blow away the heat generated by the network servers and desktop computers during operation.

In network applications, two types of fan units are commonly installed on network servers: PWM (Pulse Width Modulation) driven type and DC (Direct Current) driven type. The PWM-driven type further includes three subtypes: 100 Hz–500 Hz, 10 KHz–50 KHz, and 1 MHz–5 MHz, based on the frequency of the PWM signal being used to drive the fan unit.

Presently, PWM-driven fan units for network servers are used in conjunction with temperature sensors that are designed in such a manner that the required PWM signal generating circuitry is integrated within the temperature sensors. One drawback to this practice, however, is that if any fan unit on the network server fails and needs to be replaced with a new one, the substitute fan unit should be the same type as the failed one; i.e., if the failed fan unit is 100 Hz–500 Hz PWM-driven type, then substitute fan unit should also be 100 Hz–500 Hz PWM-driven type, and cannot be 10 KHz–50 KHz or 1 MHz–5 MHz PWM-driven type. If it is desired to use a 10 KHz–50 KHz or 1 MHz–5 MHz type as substitute, then the associated temperature sensor should also be replaced with another type that is specifically designed for use with the 10 KHz–50 KHz or 1 MHz–5 MHz type (as mentioned earlier, this is because that the required PWM signal generating circuitry is integrated within the temperature sensor). Similarly, if the originally installed fan unit is a DC-driven type, then when it fails, it must be replaced with a DC-driven type and cannot be replaced with a PWM-driven type; and vice versa. This practice is apparently quite inconvenient and uneconomical in the maintenance of the fan units. There exists therefore a need in the computer industry for a technology that allows a network server to be equipped with just one type of temperature sensor which can be used in conjunction with various different types of fan units, including PWM-driven type (which includes 100 Hz–500 Hz, 10 KHz–50 KHz, and 1 MHz–5 MHz subtypes) and DC-driven type.

SUMMARY OF THE INVENTION

It is therefore a primary objective of this invention to provide a fan operation adaptive control system which allows a network server to be equipped with just one type of temperature sensor which can be used in conjunction with various different types of fan units, including PWM-driven type (which includes 100 Hz–500 Hz, 10 KHz–50 KHz, and 1 MHz–5 MHz subtypes) and DC-driven type.

The fan operation adaptive control system according to the invention is designed for use in conjunction with an electronic system, such as a network server or a desktop computer, that is equipped with at least one heat-dissipating fan unit and a temperature sensor, for the purpose of providing the fan unit with an adaptive operation control function for adaptively control the operation of the fan unit based on the particular type of the fan unit.

In architecture, the fan unit driving control system according to the invention comprises: (A) a fan type identifying module, which is capable of identifying the particular type of the fan unit being installed to the electronic system; (B) a driving signal setting module, which is capable of generating a corresponding driving signal enable message and a corresponding switching enable message based on the particular type of the fan unit identified by the fan type identifying module; (C) a pulse width modulation signal generating module, which is capable of responding to the currently detected temperature level by the temperature sensor and being set by the driving signal enable message from the driving signal setting module by generating a pulse width modulation signal having a width in proportion to the detected temperature level; (D) a direct current conversion module, which is capable of converting the output pulse width modulation signal from the pulse width modulation signal generating module into a direct current electrical signal; and (E) a switching module, which is capable of responding to the switching enable message from the driving signal setting module by selectively switching its output between the output of the pulse width modulation signal generating module and the output of the direct current conversion module, in such a manner that in the event of the fan unit being a pulse width signal driven type, the switching module is activated by the switching enable message to select the output of the pulse width modulation signal generating module as its output to the fan unit for use to drive the fan unit; and whereas in the event of the fan unit being a direct current driven type, the switching module is activated to select the output of the direct current conversion module as its output to the fan unit for use to drive the fan unit.

The fan operation adaptive control system according to the invention is characterized by the utilization of a CPLD module for implementing the adaptive operation control function for various different types of fan units, including PWM-driven type (which includes 100 Hz–500 Hz, 10 KHz–50 KHz, and 1 MHz–5 MHz subtypes) and DC-driven type, such that the network server can be equipped with just one type of temperature sensor which can be used in conjunction with these various different types of fan units. This feature allows the maintenance of heat-dissipating fan units on network servers to be more convenient and cost-effective to implement than the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The fan operation adaptive control system according to the invention is disclosed in full details by way of preferred embodiments in the following with reference to the accompanying drawings.

Figure 1:
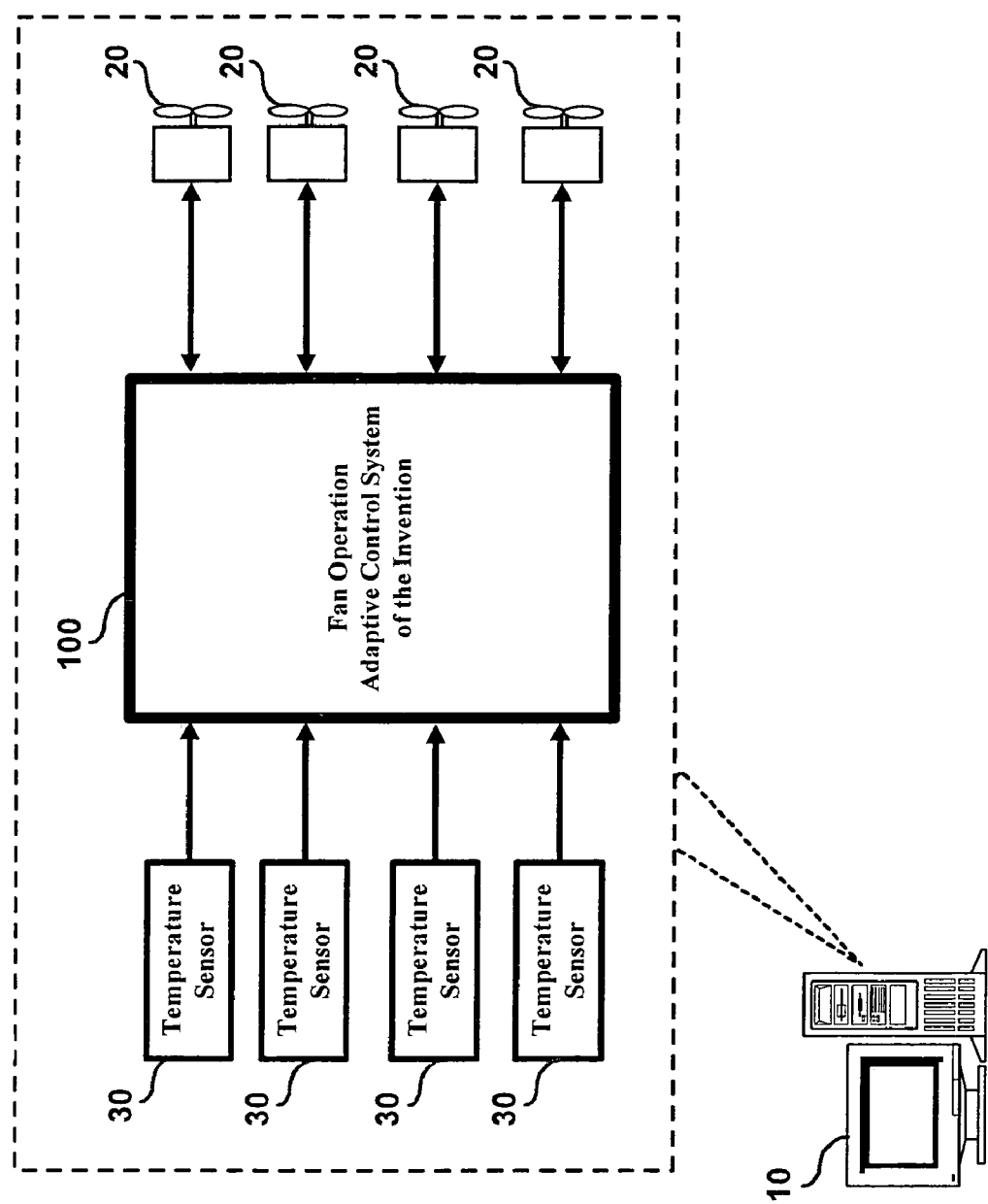
FIG. 1 is a schematic diagram showing the application of the fan operation adaptive control system according to the invention.

FIG. 1 is a schematic diagram showing the application of the fan operation adaptive control system according to the invention (as the block indicated by the reference numeral 100). As shown, the fan operation adaptive control system of the invention 100 is designed for use in conjunction with an electronic system 10, such as a desktop computer, a notebook computer, or a network server, that is equipped with at least one heat-dissipating fan unit 20 and at least one temperature sensor 30 (in the embodiment of FIG. 1, four fan units 20 and four corresponding temperature sensors 30 are shown for demonstrative purpose; but in practice, there is no limitation to the number thereof). In operation, the fan unit driving control system of the invention 100 is capable of providing each installed fan unit 20 with an adaptive operation control function for adaptively control the driving operation of the fan unit 20 based on the particular type of each fan unit 20.

In application, the fan operation adaptive control system of the invention 100 allows the user to install any type of fan unit 20 to the electronic system 10, including PWM-driven type and DC-driven type; and in the case of PWM-driven type, the user can further install different subtypes of PWM-driven fan units to the electronic system 10, including, for example, 100 Hz–500 Hz, 10 KHz–50 KHz, and 1 MHz–5 MHz subtypes. In other words, irrespective of the particular type of each fan unit 20 being installed to the electronic system 10, the fan operation adaptive control system of the invention 100 will notwithstanding allow each installed fan unit 20 to operate normally with the temperature sensor 30.

Figure 2:
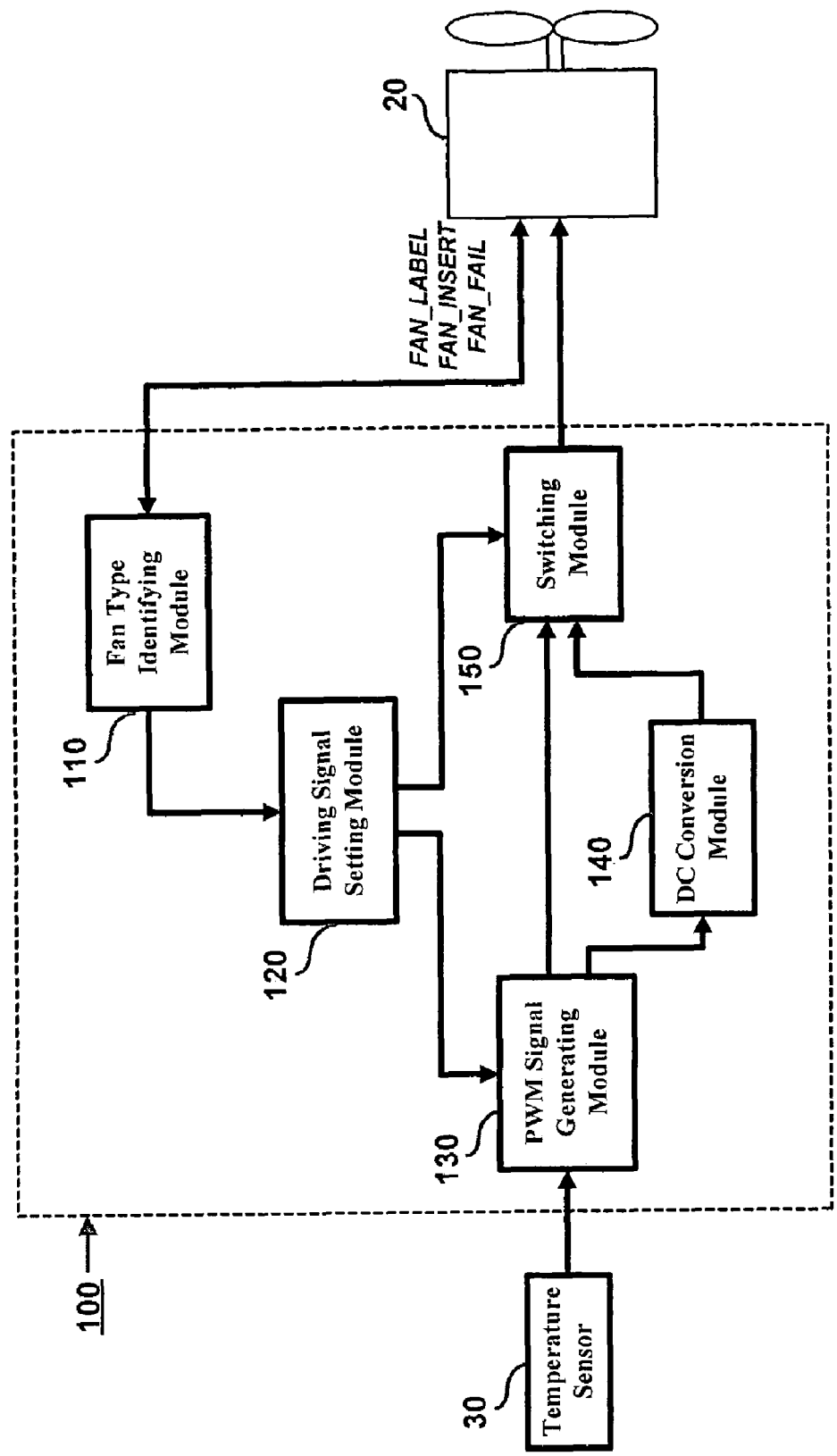
FIG. 2 is a schematic diagram showing the internal architecture of the fan operation adaptive control system according to the invention.

As shown in FIG. 2, in architecture, the fan operation adaptive control system of the invention 100 is based on a modularized component model which comprises: (A) a fan type identifying module 110; (B) a driving signal setting module 120; (C) a PWM (Pulse Width Modulation) signal generating module 130; (D) a DC (Direct Current) conversion module 140; and (E) a switching module 150. The respective attributes and behaviors of these constituent components 110, 120, 130, 140, 150 of the fan operation adaptive control system of the invention 100 are described in details in the following. In practical implementation, for example, these components 110, 120, 130, 140, 150 are integrated to a CPLD (Complex PLD, where PLD=Programmable Logic Device) module which is coupled between the fan units 20 and the temperature sensors 30.

The fan type identifying module 110 is capable of identifying the particular type of each fan unit 20 being installed to the electronic system 10. In practical implementation, for example, the fan type identifying module 110 can utilize two methods for type identification of each fan unit 20 installed to the electronic system 10. The first method is to use CPLD circuitry to electronically read an embedded set of fan label data from each installed fan unit 20, where the embedded fan label data was built into each fan unit 20 in factory. The second method is to provide a user-operated type-specifying means, such as a jumper switch, to allow the user to manually flip the jumper switch in a predefined manner that represents the particular type of each installed fan unit 20. The types of fan units that can be set by the user include, for example, 100 Hz–500 Hz PWM-driven, 10 KHz–50 KHz PWM-driven, 1 MHz–5 MHz PWM-driven, and DC-driven.

The driving signal setting module 120 is designed to generate a corresponding driving signal enable message and a corresponding switching enable message based on the particular type of each installed fan unit 20 identified by the fan type identifying module 110, and respectively transfer the driving signal enable message to the PWM signal generating module 130 and the switching enable message to the DC conversion module 140.

The PWM signal generating module 130 is designed to respond to the currently detected temperature level by the temperature sensor 30 (i.e., when the temperature level exceeds a particular upper limit) by generating a PWM signal having a corresponding width depending on the temperature level, and further capable of transferring the output PWM signal to either the DC conversion module 140 or the switching module 150 depending on the driving signal enable message from the driving signal setting module 120; i.e., if the fan unit 20 is a PWM-driven type, the driving signal enable message tells the PWM signal generating module 130 to transfer the output PWM signal to the switching module 150; and whereas if a DC-driven type, the output-PWM signal is transferred to the DC conversion module 140. In implementation, the output PWM signal from the PWM signal generating module 130 has a pulse width proportional to the currently-detected temperature level by the temperature sensors 30, which can be used to drive the fan units 20 to operate at corresponding speeds. Moreover, the PWM signal generating module 130 can also respond to a fan-insert indicating signal (denoted by FAN_INSERT, which is used to indicate that a fan unit 20 has been inserted in position to the electronic system 10) by enabling the outputting of the PWM signal; and respond to a fan-fail indicating signal (denoted by FAN_FAIL, which is used to indicate that the inserted fan unit 20 is in failed condition and thus inoperable) by inhibiting the outputting of the PWM signal.

The DC conversion module 140 is capable of being activated in the event that the fan type identifying module 110 identifies that the inserted fan unit 20 is a DC-driven type, and which is capable of converting the output PWM signal from the PWM signal generating module 130 into a DC electrical signal having a magnitude in direct proportion to the pulse width of the PWM signal. Since PWM-to-DC conversion is a well-known technology in electronics, detailed description thereof will not be given in this specification The switching module 150 is designed to respond to the switching enable message from the driving signal setting module 120 by selectively switching its output between the output of the PWM signal generating module 130 and the output of the DC conversion module 140, in such a manner that if the fan unit 20 is a PWM-driven type, the switching module 150 is activated by the switching enable message to select the output of the PWM signal generating module 130 as its output to the fan unit 20; and whereas if the fan unit 20 is a DC-driven type, the switching module 150 is activated to select the output of the DC conversion module 140 as its output to the fan unit 20.

The following is a detailed description of two practical application examples of the fan operation adaptive control system of the invention 100. In the first application example, it is assumed that each fan unit 20 inserted into the electronic system 10 is a 100 Hz–500 Hz PWM-driven type; and whereas in the second application example, it is assumed that each fan unit 20 is a DC-driven type.

Referring to FIG. 1 together with FIG. 2, in actual operation, when a 100 Hz–500 Hz PWM-driven type of fan unit 20 is inserted by the user to the electronic system 10, the fan type identifying module 110 is activated to inspect the type of the fan unit 20, for example by using CPLD circuitry to electronically read an embedded set of fan label data from each fan unit 20. If the fan unit 20 has no embedded fan label data, then the type of the fan unit 20 can be user-specified by flipping a jumper switch (which is used to implement the fan type identifying module 110) in a predefined manner that is used to indicate 100 Hz–500 Hz PWM-driven type. Based on the identified type parameters (PWM, 100 Hz–500 Hz), the driving signal setting module 120 is activated to output a corresponding driving signal enable message to the PWM signal generating module 130 and a corresponding switching enable message to the switching module 150.

During operation of the electronic system 10, whenever the temperature level inside the electronic system 10 exceeds a particular upper limit, it will cause the temperature sensor 30 to respond by activating the PWM signal generating module 130 to generate a PWM signal. In practice, the output PWM signal from the PWM signal generating module 130 has a pulse width in proportion to the detected temperature level.

In the above-mentioned case, since the fan unit 20 is a 100 Hz–500 Hz PWM-driven type, the DC conversion module 140 will be inactivated, while the switching module 150 is activated by the switching enable message from the driving signal setting module 120 to select the output of the PWM signal generating module 130 as its output to the fan unit 20. As a result, each 100 Hz–500 Hz PWM-driven type of fan unit 20 is driven by the PWM signal from the PWM signal generating module 130.

Afterwards, if the user replace the 100 Hz–500 Hz PWM-driven fan unit 20 with a DC-driven type, then the PWM signal generating module 130 is instead activated to transfer its output PWM signal to the DC conversion module 140 where the PWM signal is converted into a DC electrical signal having a corresponding magnitude, and meanwhile the switching module 150 is activated to select the output of the DC conversion module 140 as its output to the fan unit 20. As a result, the substitute DC-driven type of fan unit 20 is now driven by the output DC electrical signal from the DC conversion module 140.

In conclusion, the invention provides a fan operation adaptive control system for use with an electronic system, such as a network server, for providing the network server with an adaptive operation control function; and which is characterized by the utilization of a CPLD module for implementing the adaptive operation control function for various different types of fan units, including PWM-driven type (which includes 100 Hz–500 Hz, 10 KHz–50 KHz, and 1 MHz–5 MHz subtypes) and DC-driven type, such that the network server can be equipped with just one type of temperature sensor which can be used in conjunction with these various different types of fan units. This feature allows the maintenance of heat-dissipating fan units on network servers to be more convenient and cost-effective to implement than the prior art. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A fan operation adaptive control system for use with an electronic system equipped with at least one heat-dissipating fan unit and a temperature sensor for the purpose of providing the fan unit with an adaptive operation control function in response to a detected temperature level by the temperature sensor;

the fan operation adaptive control system comprising:

a fan type identifying module, which is capable of identifying the particular type of the fan unit being installed to the electronic system;

a driving signal setting module, which is capable of generating a corresponding driving signal enable message and a corresponding switching enable message based on the particular type of the fan unit identified by the fan type identifying module;

a pulse width modulation signal generating module, which is capable of responding to the currently detected temperature level by the temperature sensor and being set by the driving signal enable message from the driving signal setting module by generating a pulse width modulation signal having a width in proportion to the detected temperature level;

a direct current conversion module, which is capable of converting the output pulse width modulation signal from the pulse width modulation signal generating module into a direct current electrical signal; and a switching module, which is capable of responding to the switching enable message from the driving signal setting module by selectively switching its output between the output of the pulse width modulation signal generating module and the output of the direct current conversion module, in such a manner that in the event of the fan unit being a pulse width signal driven type, the switching module is activated by the switching enable message to select the output of the pulse width modulation signal generating module as its output to the fan unit for use to drive the fan unit; and whereas in the event of the fan unit being a direct current driven type, the switching module is activated to select the output of the direct current conversion module as its output to the fan unit for use to drive the fan unit.

2. The fan operation adaptive control system of claim 1, wherein the electronic system is a network server.

3. The fan operation adaptive control system of claim 1, wherein the electronic system is a desktop computer.

4. The fan operation adaptive control system of claim 1, wherein the fan unit is a PWM (Pulse Width Modulation) driven type of fan unit.

5. The fan operation adaptive control system of claim 1, wherein the fan unit is a DC (Direct Current) driven type of fan unit.

6. The fan operation adaptive control system of claim 1, wherein the fan type identifying module utilizes a method of electronically reading an embedded set of fan label data in the fan unit to identify the type of the fan unit.

7. The fan operation adaptive control system of claim 1, wherein the fan type identifying module is a jumper switch that is capable of being manually set in a predefined manner to represent the type of the fan unit.

8. The fan operation adaptive control system of claim 1, wherein the fan type identifying module, the driving signal setting module, the pulse width modulation signal generating module, the direction current conversion module, and the switching module are integrated to a CPLD (Complex PLD, where PLD=Programmable Logic Device) module.

* * * * *